United States Patent [19]
Thomson, Jr.

[11] 4,005,913
[45] Feb. 1, 1977

[54] LINEAR MOTION BEARING BLOCK

[75] Inventor: John B. Thomson, Jr., Sands Point, N.Y.

[73] Assignee: Thomson Industries, Inc., Manhasset, N.Y.

[22] Filed: Jan. 8, 1975

[21] Appl. No.: 539,389

[52] U.S. Cl. .............................. 308/6 C; 308/5 R; 308/240; 184/5

[51] Int. Cl.² ........................................ F16C 17/00

[58] Field of Search ............ 308/6 R, 6 C, 3.5, 202, 308/203, 72, 78, 22, 5 R, 31, 240, 36.1, 189 R, 189 A, 207 R, 207 A; 184/5, 100

[56] References Cited
UNITED STATES PATENTS

| | | |
|---|---|---|
| 3,162,268 | 12/1964 | Short ....................................... 184/5 |
| 3,545,826 | 12/1970 | Magee et al. ....................... 308/6 C |
| 3,718,209 | 2/1973 | Moslo ................................ 308/5 X |
| 3,876,265 | 4/1975 | McCloskey ......................... 308/6 C |

Primary Examiner—Robert R. Song
Assistant Examiner—Gene A. Church
Attorney, Agent, or Firm—Morgan, Finnegan, Pine, Foley & Lee

[57] ABSTRACT

At least two linear motion bearings are mounted coaxially within a housing for relative movement with respect to a shaft located in the bore of the bearings. Preferably, the bearings are of the recirculating ball type and may be self-aligning or non-self-aligning. Seals are provided to cooperate with the bearings and housing to form an enlarged lubricant reservoir between the bearings when externally lubricated bearings are utilized, and means are provided for preloading the bearings.

17 Claims, 11 Drawing Figures

LINEAR MOTION BEARING BLOCK

BACKGROUND OF THE INVENTION

With the increased use of linear motion bearings in machinery and other applications, it has become desirable to decrease both the cost of the bearings as well as the cost of installations. Examples of linear motion bearings in the prior art include: Magee, U.S. Pat. No. 2,628,135; Magee and Thomson, U.S. Pat. No. 3,545,826; and Thomson, U.S. Pat. No. 3,588,200. These linear motion bearings are of the recirculating ball type in which the ball bearings travel in a generally elliptical path. One straight run portion of the path functions as a load bearing portion and the other straight run path is a non-load carrying portion.

When linear motion bearings are used in applications requiring more than one bearing, it will be appreciated that time consuming accurate mounting of the bearings relative to the shaft on which the bearing will ride is of great importance. Lubrication of the bearings presents serious problems in long stroke applications since a certain amount of lubricant tends to be carried on the shaft past the seals. This loss of lubricant results in the necessity of replenishing the lubricant at periodic intervals.

While the lubrication problem is somewhat alleviated by the use of lubricant impregnated ball retainers, such as disclosed in Magee and Thomson U.S. Pat. No. 3,545,826, bearing contamination due to material carried on the shaft has required the use of wiping seals at each end of the bearing. In applications where a plurality of linear bearings are required, the use of these wiping seals produces undesirable drag in many applications where minimal friction is essential.

SUMMARY OF THE INVENTION

The present invention relates to a self-contained bearing mount in which at least two linear bearings are mounted in coaxial, spaced-apart relationship in a housing. Preferably the linear motion bearings are of the self-aligning type, but the present invention also contemplates the use of non-self-aligning linear motion bearings. The housing and bearings therein are adapted for relative movement with respect to a shaft located in the bore of the linear motion bearings. The housing and linear bearings may accommodate variations in the diameter of the shaft, as well as, variations of the shaft from true axial alignment caused by deflections due to load.

Since the bearing mount of the invention is a self-contained assembly it is easily mounted to a machine element or the like, and expensive, precision boring for the mounting of individual bearing blocks on the machine element is eliminated. Accordingly, the number of mounting holes required to mount the assembly is reduced by an order of about one half, and the entire assembly may be quickly aligned on the machine element for rapid installation.

In applications requiring the use of externally lubricated bearings, the internal bore of the housing between the linear motion bearings cooperates with seals to form an enlarged lubricant reservoir to greatly extend lubrication recycling time. Since the bearing block is self-contained, wiping seals, which prevent contamination of the ball bearings, are positioned at the exterior portions of the assembly only, thereby greatly reducing the frictional drag generated by the seals.

The bearing housing is easily fabricated from extruded material, such as aluminum, which may be economically produced to provide low cost production of various lengths of custom made units. This ease of production allows not only for ready made, shelf available units, but also allows the use of a single bearing mount assembly to mount a machine element to its shaft, thereby greatly reducing installation time, materials, and machining. This advantage is particularly exemplified when the bearing mounts of the invention are used to form an X-Y saddle which merely requires the use of four self-contained units which are interconnected at their extremities to form a box-like structure for the saddle.

Preferably, the linear motion bearings used in the present invention are the self-aligning type, such as those described in the aforementioned Magee and Thomson and Thomson patents, to permit the block to accommodate shaft load deflections. The bearing mount unit may have a continuous circumference, or have a longitudinal slot for preloading the bearings, or may have a substantial clearance opening to accommodate open type linear motion bearings.

Alternative to preloading the bearings by means of clamping the longitudinal slot, further means are disclosed for resiliently preloading the load-bearing plates of the bearings. This preloading is provided by the use of elastomeric material or wave springs interposed between the bearing load-carrying plates and the housing, and the use of external preloading elements mounted on the housing. The preloading element extends through openings in the housing to resiliently engage at least two adjacent load bearing plates and are adjustable to allow for variation in the desired loading on the bearings.

DETAILED DESCRIPTION

Figure 1:
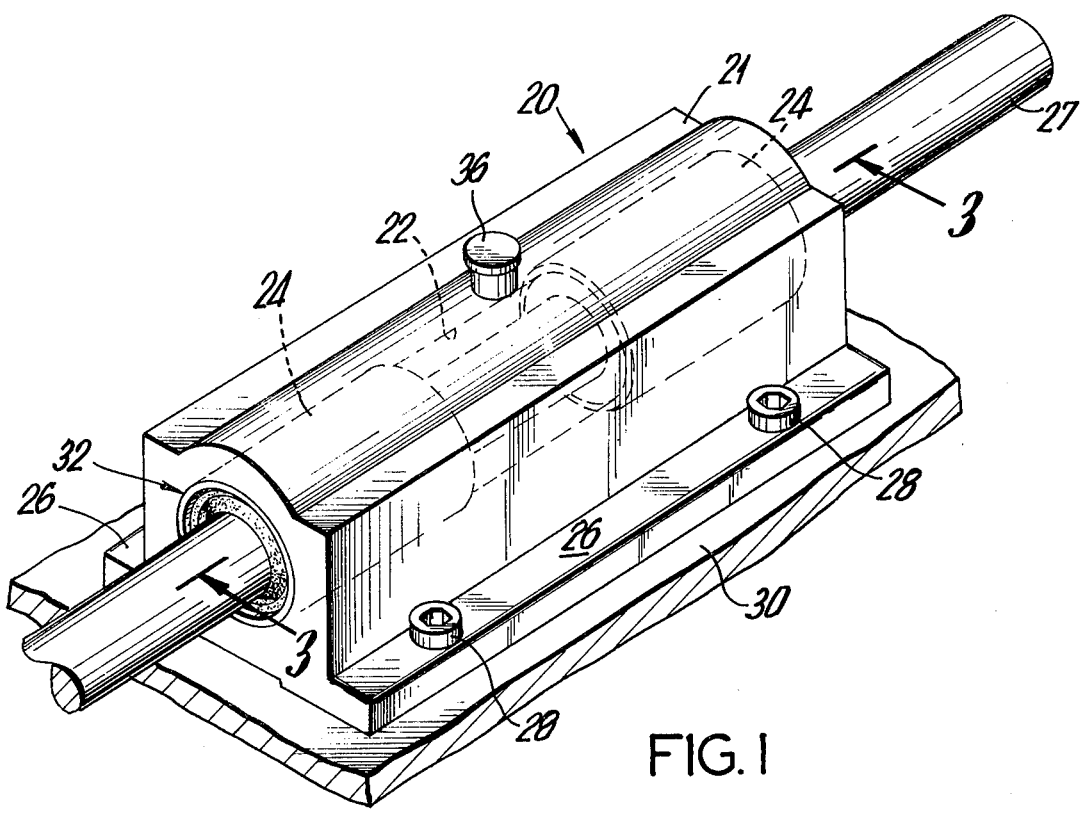
FIG. 1 is a perspective view of a bearing mount illustrating two linear motion ball bearings in coaxial spaced-apart relationship within a housing and a shaft located coaxially within the bores of the bearings.
Figure 2:
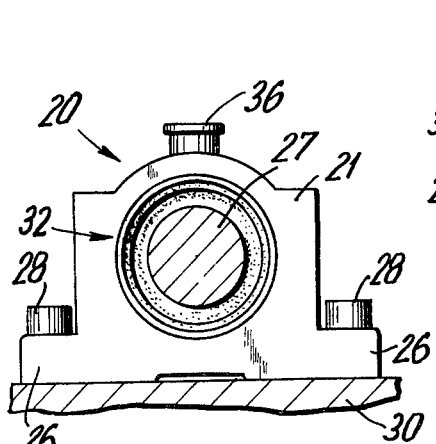
FIG. 2 is an end view of the mount shown in FIG. 1.

While this invention is susceptible of embodiment in many different forms, there is shown in the drawings and will hereinafter be described in detail a preferred embodiment of the invention and modifications thereto, with the understanding that the present disclosure is to be considered as an exemplification of the principles of the invention and not intended to limit the invention to the embodiments illustrated.

Broadly, the invention comprises a housing mount having a central longitudinal bore in which two or more linear motion bearings are located. Seals are placed at each end of the housing and serve to firmly hold each linear motion bearing in place within the housing, to minimize the loss of lubricant and wipe contaminants from the shaft as it enters the bearings.

FIG. 1 illustrates a bearing mount 20 in accordance with the present invention which includes an elongated housing mount 21 having a longitudinally extending bore 22 formed therein. Housing mount 21 may be fabricated from any suitable material preferably extruded aluminum which may be fabricated economically in long lengths. Two linear motion bearings 24 are positioned coaxially within bore 22 to slidably receive a shaft 27 therein. Housing mount 21 is provided at each side with outwardly extending flanges 26 which are each apertured at spaced-apart locations to provide mounting holes for the reception of installation bolts 28. Bolts 28 are utilized to secure the bearing block 20 to a machine element 30 or the like. It will thus be appreciated that machine element 30 requires substantial less machining for mounting bearing block 20 thereon, as compared to individual bolt mounting of each bearing since the number of mounting bolts is reduced by an order of about one half.

Figure 3:
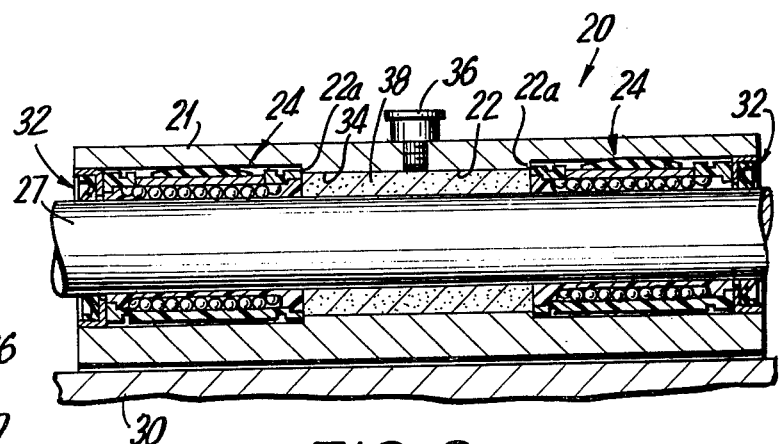
FIG. 3 is a longitudinal cross-sectional view illustrating two linear motion bearings and their relationship to the housing and shaft.

Each bearing 24 is positioned within bore 22 by the cooperative action of an annular shoulder 22a in bore 22 against which the interior end of each bearing abuts and end seals 32, FIG. 3. Seals 32 function not only to prevent relative axial movement between bearings 24 and housing mount 21, but also provide a lubricant seal and means for wiping contaminants from the shaft as it moves relative to bearing block 20. Housing mount 21 is of sufficient length to position bearings 24, preferably, in spaced-apart relationship, and the central portion of bore 22 between the bearings provides an enlarged lubricant reservoir 34. Access to lubricant reservoir 34 may be had through an oil cup 36, located on the housing, which has a passageway communicating with the reservoir. Reservoir 34 may also include a wick element 38 to facilitate lubrication of the shaft and bearings.

Figure 4:
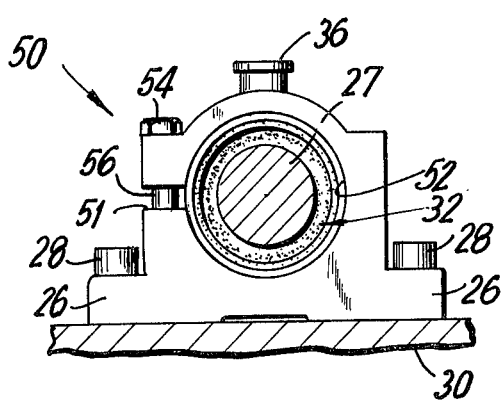
FIG. 4 is an end view of another form of bearing mount having a housing with a longitudinal slot to permit pre-loading of the bearings within the housing.

Housing mount 21 may have a continuous bore circumference, as illustrated in FIG. 1, or may be of the adjustable, or open type as will be described. FIG. 4 illustrates a housing mount 50 of the adjustable type in which the housing defines a longitudinally extending slot 51 which opens to bore 52. A plurality of adjustment bolts 54 threadably engage the housing mount 50 and bridge slot 51 so that the housing operates as a collar clamp for applying a preloading force to the bearings 24 within bore 52 as bolts 54 are tightened. Since slot 51 opens to bore 52, which is similar to bore 22 previously described, a compressible seal strip 56 is positioned within slot 51 to provide a means for sealing the lubricant reservoir along the slot.

Figure 5:
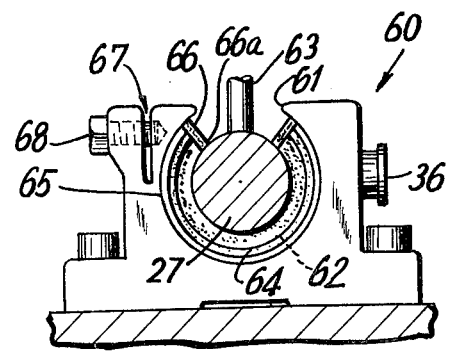
FIG. 5 is an end view of a still further form of bearing mount suitable for use with open type linear motion ball bearings.

The housing mount may also be of the open type, as illustrated in FIG. 5. Housing mount 60 defines a longitudinal channel 61, and linear motion bearings 62 are the open type having their openings adjacent channel 61 to accommodate the passage of shaft supports 62 through the bearing block during relative axial movement therebetween. In this embodiment, end seals 64 are segmented at the open portion of bearings 62, and longitudinally extending sealing strips 66 are positioned between the shaft 27 and the bore of housing mount 60 to form the lubricant reservoir. Each strip 66 has an inner edge or lip 66a adapted to sealingly engage shaft 27.

The open type bearing mount may also include means for preloading the bearings. One means is illustrated in FIG. 5 in which housing mount 60 includes a longitudinal slot 67 adjacent bore 65. Adjusting bolts 68 are threaded across slot 67 to provide a collar clamp for applying a preloading force to the bearings.

Figure 7:
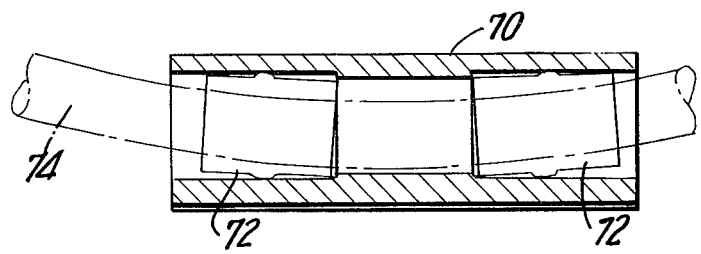
FIG. 7 is a schematic cross-sectional view illustrating the manner in which self-aligning linear motion bearings function with a housing to accommodate deflections (shown exaggerated) of the shaft due to load.

The linear motion bearing used in the present invention may be of any type, but are preferably of the recirculating ball type, and may be self-aligning or non-self-aligning, preferably self-aligning. Self-aligning bearings mounted in coaxial spaced-apart relationship within a housing readily accommodate axial deviation of a loaded shaft 74, as illustrated in FIG. 7. Self-aligning bearings 72 may be of the type described in the above-identified Magee and Thomson, or Thomson patents, the disclosures of which are hereby incorporated by reference to the extent that they are not inconsistent with the present disclosure.

Figure 6A:
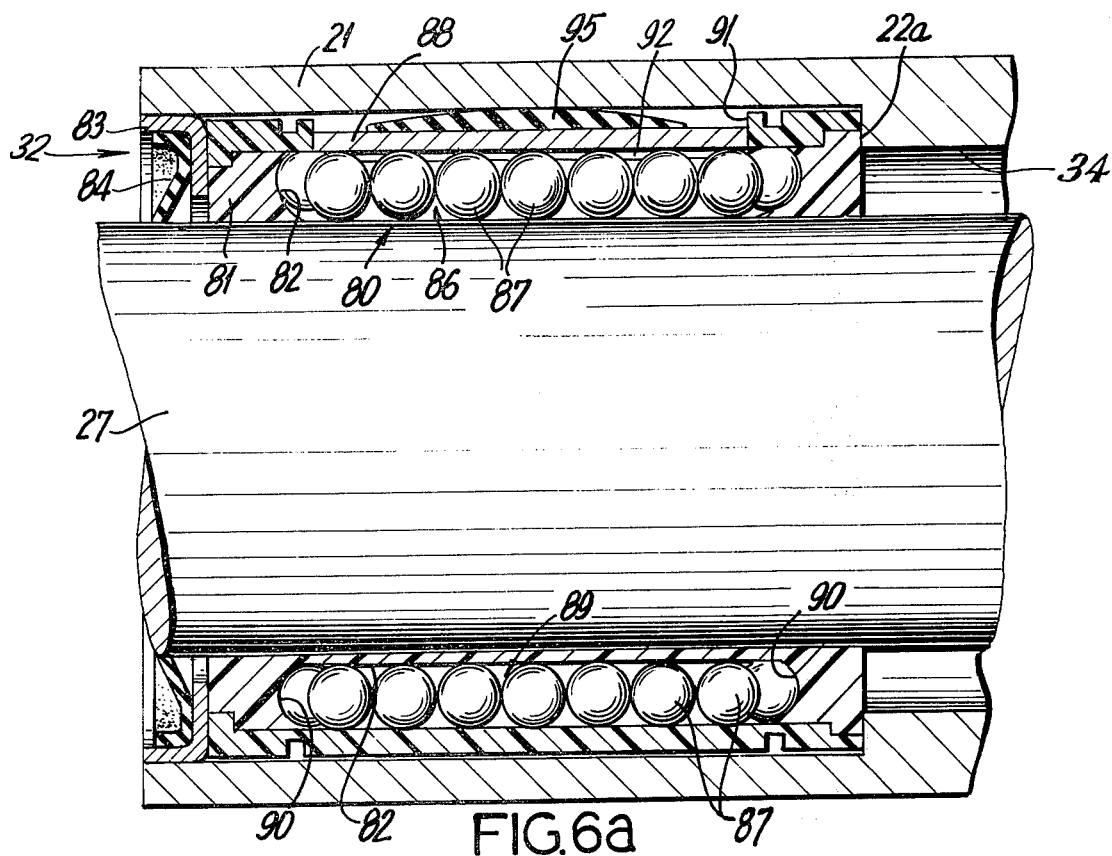
FIGS. 6a and 6b are fragmentary, longitudinal cross-sectional views illustrating self-aligning bearings within a housing and means for pre-loading the bearings.
Figure 6B:
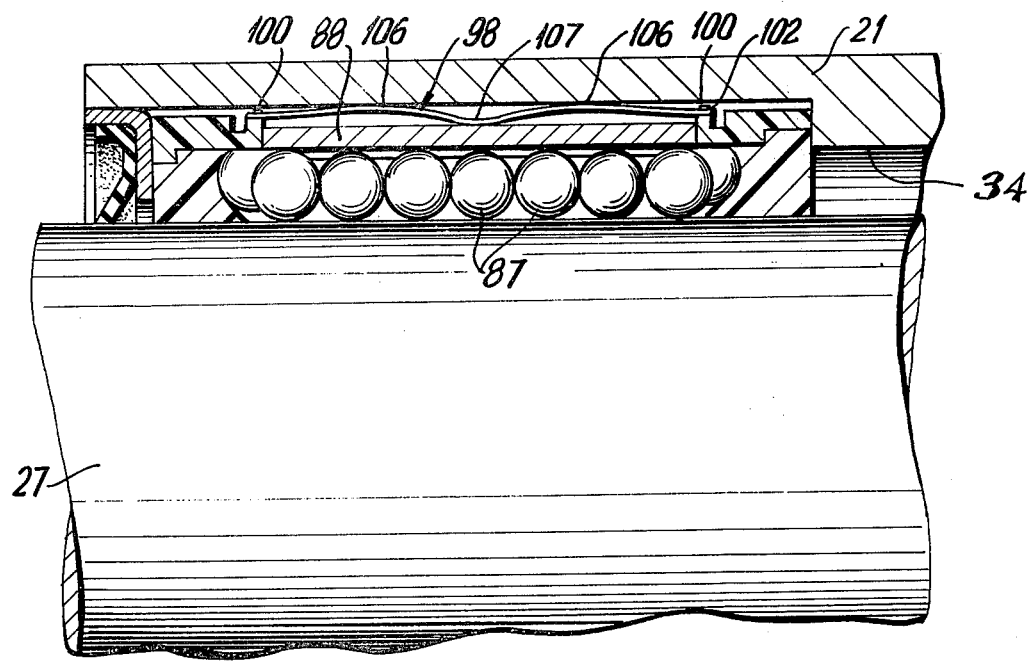

FIGS. 6a and 6b show self-aligning linear motion bearings having an internal means for preloading the bearing although non-preloaded bearings may also be used. The illustrated bearing blocks include a closed circumferential type housing mount 21 in which are positioned two linear motion ball bearings 80 (although only one of the bearings is illustrated) and a shaft 27 slidably received within the bore of the bearing.

Each linear motion bearing 80 includes a ball retainer 81 surrounding shaft 27, and having a plurality of generally oval shaped raceways 82 formed therein. The interior edge of retainer 81 abuts against shoulder 22a formed in housing mount and is held there by end seal 32 which includes a press-fitted or swaged end ring 83 to prevent axial relative movement between the bearing and housing mount and a wiper seal 84.

Each oblong raceway 82 has a first straight, load-bearing portion 86 wherein recirculating balls 87 are in direct bearing contact with both shaft 27 and a load carrying plate 88, and a further straight portion 89 wherein balls 87 are out of contact with shaft 27 and are free of load. The straight portions 86 and 89 are interconnected at their end portions by curved portions 90 which permit the recirculating balls to pass freely from one straight portion of the raceway into the other according to the direction in which the load carrying balls are impelled by the relative movement of the shaft 27.

Each load bearing plate 88 is positioned within a radial cut-out 91 within retainer 81 to prevent relative axial and circumferential movement between the plate and retainer. Each plate 88 is formed with a longitudinal depression 92 at the surface on which balls 87 rotate. In the Magee and Thomson patent, U.S. Pat. No. 3,545,826 bearing plates 88 have an intermediate, longitudinal central portion which is thicker than the end portions so that the plates may rock to accommodate axial load induced deviation of the shaft 27. In the embodiments illustrated in FIGS. 6a and 6b, the intermediate thickened portion is provided by positioning a compressible preloading member between the outer surface of plate 88 and the inner surface of housing mount 21.

In FIG. 6a compressible member 95 is in the form of a contoured, elastomeric member having a central thickened portion and outwardly tapered end portions to provide for longitudinal rocking movement of the bearing plate. By varying the cross-sectional thickness of elastomeric member 95, as well as utilizing elastomeric material having different hardnesses, it will be appreciated that the preloading of the bearings may be accurately preselected and changed as desired.

In the embodiment illustrated in FIG. 6b, the compressible member takes the form of a wave washer 98 extending longitudinally between plate 88 and housing mount 21. Each spring is retained at its ends by means of rings 100 which are positioned in overlying relationship to the ends of the spring and extend around retainer 81 to secure the ends of the spring within cut-out 102 in the retainer. Spring 98 has two peaks 106 in engagement with housing 21 and a single peak 107 in engagement with the intermediate portion of plate 88 so that the plate is loaded radially inwardly and also permitted to rock angularly relative to housing mount 21. Although spring 98 is illustrated as a three peak, spring washer, it will be appreciated that other shapes may be employed to provide central loading of plate 88.

Figure 8:
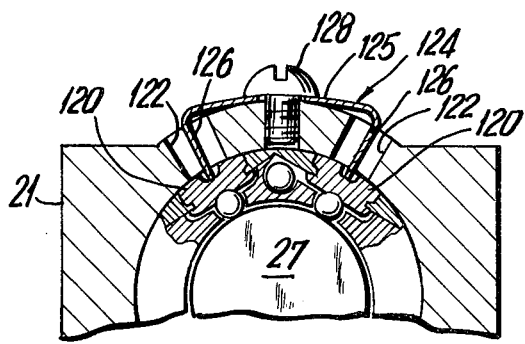
FIGS. 8 and 9 are fragmentary transverse cross-sectional views of self-aligning bearings and housings illustrating externally mounted means for pre-loading of the bearings.
Figure 9:
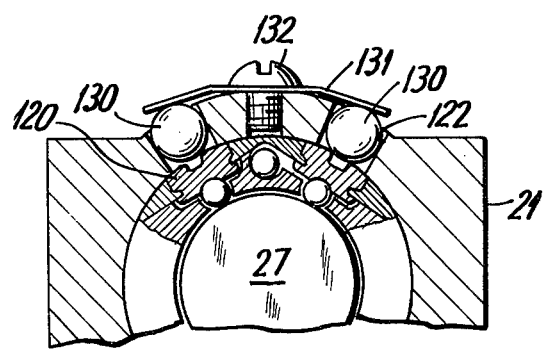

In addition to internally loading the bearings to accommodate for axial loading to deviation of the shaft, the bearings may be loaded externally, as illustrated in FIGS. 8 and 9. In these modifications housing mount 21 is again of the continuous circumferential type, although the split and open type may also be utilized. Two adjacent bearing plates 120 are modified to permit external preloading while the remaining bearing plates (not shown) are constructed in accordance with McGee and Thomson patent, U.S. Pat. No. 3,545,826 to provide integral, intermediate thickened portions. Housing mount 21 is provided with a pair of angularly spaced, radially extending openings 122 which provides access to the modified plates 120. In FIG. 8, plates 120 are preloaded by means of a generally U-shaped element 124 having a base portion 125 and downwardly extending leg portions 126 which are preferably formed on a radius of the bearing. The central portion of base 125 is apertured to receive an adjustment bolt 128 which is threadably engaged to the exterior of housing mount 21. As bolt 128 is tightened the ends of leg portions 126 bear against the intermediate portions of plates 120 to bias the plates radially inwardly and thus preload the bearing. Member 124 may be formed of any suitable material, preferably a resilient material, such as a flat steel spring or music wire, so that as bolt 128 is tightened resilient biasing is achieved.

FIG. 9 illustrates a still further means for preloading the plates 120. In place of element 124, two balls 130 are positioned in openings 122 and biased inwardly by means of a resilient retainer tab 131 which is adjustably secured to housing 21 by means of bolt 132. In this manner, as bolt 132 is threaded inwardly balls 130 are resiliently biased into engagement with the intermediate portion of their associated plates 122.

Figure 10:
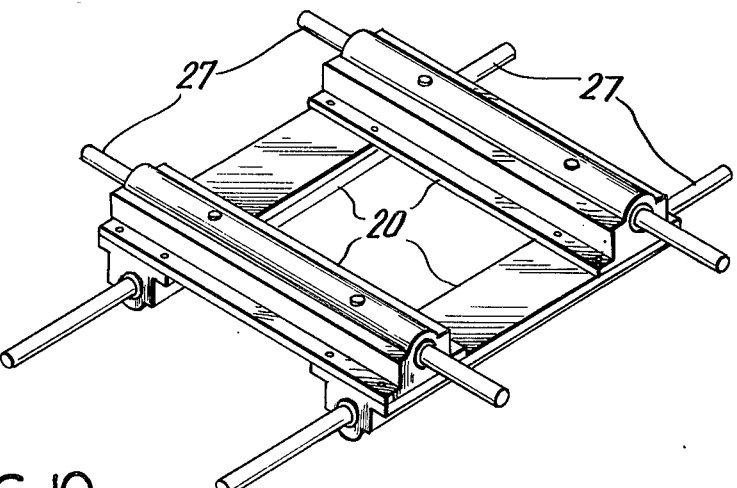
FIG. 10 is a perspective view illustrating the use of one form of the bearing mounts of the present invention in a saddle capable of X-Y movement.

From the above discussion, it will be readily apparent that the present invention discloses a bearing mount which may be economically produced and which requires substantially lower installation cost due to its self-contained, off-the-shelf type construction. The adaptability of the present invention is particularly exemplified in FIG. 10 which illustrates four bearing mounts 20 in accordance with the present invention used as an X-Y saddle. In such an application four bearing blocks are interconnected at their end portion to provide for rapid fabrication with minimum installation cost.

In view of the above disclosure, it would be readily apparent to those skilled in the art that other modifications may be made to the invention without departing from the scope and spirit thereof as pointed out in the appended claims.

What is claimed is:

1. A linear motion bearing block, adapted for relative axial movement on a shaft, which comprises: an elongated housing mount having a longitudinally extending bore adapted to receive said shaft; a plurality of linear motion ball bearings positioned coaxially within the bore of said housing mount in spaced-apart relationship, said bearings being adapted to slidably engage said shaft; each of said linear motion ball bearings including a ball retainer defining a plurality of raceways, each of said raceways having a load-bearing portion and a load-free portion and substantially filled with balls which recirculate in said raceways; load-carrying plates positioned adjacent each of said load-bearing portions of each of said raceways; means for permitting relative angular movement between each of said bearings and said housing mount; means for radially preloading said load-carrying plates; and, sealing means cooperating with said bearings and housing mount to form a lubricant reservoir in said bore between said spaced-apart bearings, whereby said bearings are lubricated and said shaft is wiped as it moves through said bore.

2. The bearing mount of claim 1, wherein said bearings and said housing define a longitudinally extending channel open to said shaft, and said sealing means includes a pair of axially extending seal strips positioned in said channel between the housing mount and shaft, each of said strips having an inner lip adapted to engage said shaft to form said reservoir.

3. The linear motion bearing block of claim 1, in which said means for permitting relative angular movement between each of said bearing and said housing includes a contoured compressible member positioned between each of said load-carrying plates and said housing mount.

4. The bearing block of claim 1, wherein said means for permitting relative angular movement includes means for maintaining contact between the intermediate portion of each load-carrying plate and said housing mount, whereby said plate may rock as said shaft is angularly displaced for coaxial alignment with said retainer.

5. The bearing block of claim 4, wherein said preloading means includes a compressible member positioned between each of said plates and said housing mount, said preloading means providing said contact maintaining means.

6. The bearing block of claim 5, wherein said compressible member is a wave spring.

7. The bearing block of claim 5 wherein said compressible member is formed of elastomeric material.

8. A linear motion bearing block, adapted for relative axial movement on a shaft, which comprises: an elongated housing mount having a longitudinal bore adapted to receive said shaft; two linear motion ball bearings positioned coaxially within said bore in spaced-apart relationship, said bearings being adapted to slidably engage said shaft, each of said bearings including means for preventing relative axial movement between said housing and said bearings; each of said linear motion ball bearings including a ball retainer defining a plurality of raceways, each of said raceways having a load-bearing portion and a load-free portion and substantially filled with balls; load-carrying plates positioned adjacent each of said load-bearing portions of each of said raceways; means for maintaining contact between the intermediate portion of each plate and said housing mount, whereby said plates may rock as said shaft is angularly displaced from coaxial alignment with the retainer; and means for preloading said bearings.

9. The bearing block of claim 8, wherein said contact maintaining means is provided by an enlarged thickness portion in said load bearing plates.

10. The bearing block of claim 8, wherein said contact maintaining means functions as said preloading means, the means including a compressible member interposed between each of said plates and said housing to resiliently bias the intermediate portion of each of said plates radially inwardly.

11. The bearing block of claim 10, wherein said compressible member is a wave spring.

12. The bearing block of claim 10, wherein said compressible member is formed of elastomeric material.

13. A linear motion bearing block, adapted for relative axial movement on a shaft, which comprises: an elongated housing mount having a longitudinally extending bore adapted to receive said shaft and a longitudinal slot; a plurality of linear motion ball bearings positioned coaxially within the bore of said housing mount in spaced-apart relationship, said bearings being adapted to slidably engage said shaft; each of said linear motion ball bearings including a ball retainer defining a plurality of raceways, each of said raceways having a load-bearing portion and a load-free portion and substantially filled with balls which recirculate in said raceways; means for permitting relative angular movement between each of said bearings and said housing mount; clamping means for varying the diameter of said bore to pre-load said bearings; and, sealing means cooperating with said bearings and housing mount to form a lubricant reservoir in said bore between said spaced-apart bearings and including a longitudinal compressible seal strip positioned in said slot, whereby said bearings are lubricated and said shaft is wiped as it moves through said bore.

14. A linear motion bearing block, adapted for relative axial movement on a shaft, which comprises: an elongated housing mount having a longitudinal bore adapted to receive said shaft; two linear motion ball bearings positioned coaxially within said bore in spaced-apart relationship, said bearings being adapted to slidably engage said shaft, each of said bearings including means for preventing relative axial movement between said housing and said bearings; each of said linear motion ball bearings including a ball retainer defining a plurality of raceways, each of said raceways having a load-bearing portion and a load-free portion and substantially filled with balls; load-carrying plates positioned adjacent each of said load-bearing portions of each of said raceways; means for maintaining contact between the intermediate portion of each plate and said housing mount, whereby said plates may rock as said shaft is angularly displaced from coaxial alignment with the retainer; said housing mount defining a longitudinal slot; and clamping means operative with said housing mount for adjusting the diameter of said bore to pre-load said bearings.

15. A linear motion bearing block, adapted for relative axial movement on a shaft, which comprises: an elongated housing mount having a longitudinal bore adapted to receive said shaft; two linear motion ball bearings positioned coaxially within said bore in spaced-apart relationship, said bearings being adapted to slidably engage said shaft, each of said bearings including means for preventing relative axial movement between said housing and said bearings; each of said linear motion ball bearings including a ball retainer defining a plurality of raceways, each of said raceways having a load-bearing portion and a load-free portion and substantially filled with balls; load-carrying plates positioned adjacent each of said load-bearing portions of each of said raceways; means for maintaining contact between the intermediate portion of each plate and said housing mount, whereby said plates may rock as said shaft is angularly displaced from coaxial alignment with the retainer; said housing mount further having radial openings to provide access to said plates; and means for pre-loading said bearings including a member mounted on the exterior of said housing mount, said member having plate engaging portions extending through said openings to engage at least two of said plates; and means for adjusting the depth of insertion of said plate engaging portions to vary the pre-loading, each of said plate engaging portions providing said contact maintaining means for the associated plate.

16. The bearing block of claim 15, wherein said member is a generally U shaped spring, the free end of the legs of said spring being adapted to engage adjacent plates in said bearing.

17. A linear motion bearing block, adapted for relative axial movement on a shaft, which comprises: an elongated housing mount having a longitudinal bore adapted to receive said shaft; two linear motion ball bearings positioned coaxially within said bore in spaced-apart relationship, said bearings being adapted to slidably engage said shaft, each of said bearings including means for preventing relative axial movement between said housing and said bearings; each of said linear motion ball bearings including a ball retainer defining a plurality of raceways, each of said raceways having a load-bearing portion and a load-free portion and substantially filled with balls; load-carrying plates positioned adjacent each of said load-bearing portions of each of said raceways; means for maintaining contact between the intermediate portion of each plate and said housing mount, whereby said plates may rock as said shaft is angularly displaced from coaxial alignment with the retainer; said housing mount having radial openings to provide access to said plates, and means for pre-loading said bearings including balls positioned in said openings and means mounted on the exterior of said housing for biasing each of said balls inwardly against its associated plate.

* * * * *

UNITED STATES PATENT AND TRADEMARK OFFICE
CERTIFICATE OF CORRECTION

PATENT NO. : 4,005,913
DATED : February 1, 1977
INVENTOR(S) : John B. Thomson, Jr.

It is certified that error appears in the above-identified patent and that said Letters Patent are hereby corrected as shown below:

Column 5, line 33, delete "for axial loading to deviation" and insert therefor - - bending - -

Signed and Sealed this

Twenty-first Day of June 1977

[SEAL]

Attest:

RUTH C. MASON
Attesting Officer

C. MARSHALL DANN
Commissioner of Patents and Trademarks